United States Patent [19]

Sakata et al.

[11] 3,884,990

[45] May 20, 1975

[54] AROMATIC CO-POLYESTER COMPOSITION CONTAINING POLYETHYLENE OXYBENZOATE AND AROMATIC PHENOLIC POLYESTER

[75] Inventors: Hiroshi Sakata; Nakaba Asahara; Yasuhiko Asai; Hirozo Hasegawa, all of Kyoto, Japan

[73] Assignee: Unitika, Ltd., Amagasaki, Japan

[22] Filed: May 16, 1974

[21] Appl. No.: 470,485

[30] Foreign Application Priority Data
May 18, 1973 Japan.............................. 48-55297

[52] U.S. Cl. ............. 260/860; 260/40 P; 260/40 R; 260/45.7 P; 260/45.7 R; 260/45.8 NZ; 260/47 C; 260/47 R; 260/49; 260/78.3 R
[51] Int. Cl. ............................................ C08g 39/10
[58] Field of Search ...................................... 260/860

[56] References Cited
UNITED STATES PATENTS

| | | | |
|---|---|---|---|
| 3,381,057 | 4/1968 | Senoo et al. ........................ | 260/860 |
| 3,533,903 | 10/1970 | Kinoshita ........................... | 260/860 |
| 3,557,055 | 1/1971 | Bonnard ............................ | 260/860 |
| 3,652,714 | 3/1972 | Berger ............................... | 260/860 |

*Primary Examiner*—Paul Lieberman
*Attorney, Agent, or Firm*—Sughrue, Rothwell, Mion, Zinn & Macpeak

[57] ABSTRACT

A composition comprising an aromatic co-polyester and poly(ethylene oxybenzoate), in which a. the aromatic co-polyester is a resinous product represented by the formula:

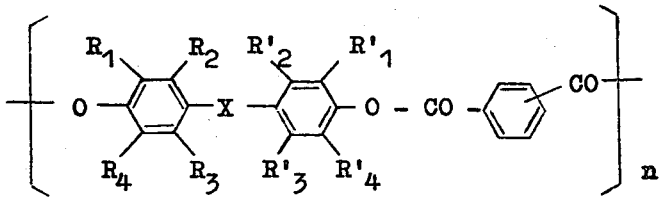

wherein X is —O—, —S—, —SO—, —SO$_2$—, an alkylene group or an alkylidene group; $R_1$, $R_2$, $R_3$, $R_4$, $R'_1$, $R'_2$, $R'_3$ and $R'_4$, which may be the same or different, each is a hydrogen atom, a chlorine atom, a bromine atom or a hydrocarbon group having 1 to 6 carbon atoms and $n$ is a positive integer which provides a resinous product;

b. the poly(ethylene oxybenzoate) is present in an amount of from 0.1 to 50 weight % based on the sum of the weight of the aromatic co-polyester and the poly(ethylene oxybenzoate); and c. the

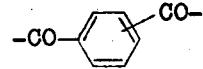

moiety in the above formula is a terephthalic acid unit or an isophthalic acid unit, and is present in the aromatic co-polyester at a molar ratio of 9:1 to 1:9, respectively, useful as a composition for producing molded articles having improved hydrolysis, cracking and crazing resistance.

23 Claims, No Drawings

AROMATIC CO-POLYESTER COMPOSITION CONTAINING POLYETHYLENE OXYBENZOATE AND AROMATIC PHENOLIC POLYESTER

BACKGROUND OF THE INVENTION

1. Field of the Invention

This invention relates to aromatic co-polyester compositions and, more particularly, to aromatic co-polyester compositions containing poly(ethylene oxybenzoate) to achieve improved hydrolysis, cracking and crazing resistance in molded articles produced therefrom.

2. Description of the Prior Art

In general, aromatic co-polyesters prepared from bisphenols or functional derivatives thereof and a terephthalic acid-isophthalic acid mixture or a mixture of the functional derivatives thereof, i.e., bisphenol terephthalate-bisphenol isophthalate copolyesters, have excellent mechanical properties such as tensile strength, bending strength, bending recovery or impact strength, excellent thermal properties such as deflection temperature under load or degradation temperature, excellent electrical properties such as resistivity, electric breakdown endurance, arc resistance, dielectric constant or dielectric loss and low flamability, good dimensional stability and the like.

These aromatic co-polyesters are thus useful in many fields. Aromatic co-polyesters find special use as plastics for injection molding, extrusion molding, press molding and the like, as monofilaments, films and coatings.

Aromatic co-polyesters have excellent characteristics in the various fields mentioned above, but unfortunately, products produced from these aromatic co-polyesters, especially molded plastics, show "crazing" when left in hot water or steam. The term "crazing" means the phenomena that molded products become cloudy, partially or completely, with a fine crack-like pattern being generated on the surface of or in the interior of the products. "Crazing" not only reduces the transparency of the products, which is one of the characteristics of aromatic co-polyesters, but reduces the toughness of the products, so that the impact strength and the elongation at yield of the molded products is reduced.

On the other hand, "cracking" is the long-time brittle failure of a material under stress appreciably below the limits of the short-time strength of the material. The phenomena of "cracking" is observed not only in plastics but also in various materials. Corrosion-cracking of metals, frost-cracking of rocks, and seasoning cracking of woods are all examples of cracking.

For materials to be durable, cracking resistance is most important and such is important with respect to the durability of aromatic co-polyesters as well. While prior art aromatic co-polyesters have the excellent properties set forth above, they are subject to cracking and crazing and therefore are not completely satisfactory as molding materials.

SUMMARY OF THE INVENTION

It is an object of this invention to improve the hydrolysis resistance of articles made from aromatic co-polyesters.

It is another object of this invention to reduce the cracking and crazing of articles made from aromatic co-polyesters.

It is a further object of this invention to improve the moldability of aromatic co-polyesters.

It is still another object of this invention to provide novel aromatic co-polyester compositions which can be used as molded articles, mono-filaments, films and the like.

These and other objects of this invention will become apparent from the description of the invention given hereinafter.

It has been found that the incorporation of poly(ethylene oxybenzoate), as hereafter defined, into an aromatic co-polyester prior to the molding of the aromatic co-polyester improves these disadvantages, i.e., according to the present invention, the hydrolysis resistance can be effectively prevented and the cracking and crazing resistance can be increased. Moreover, the compositions of the present invention have high hydrolysis resistance and good moldability, while the original advantages of the aromatic co-polyesters are substantially maintained.

This invention provides a composition comprising an aromatic co-polyester and poly(ethylene oxybenzoate), in which a. the aromatic co-polyester is a resinous product represented by the formula:

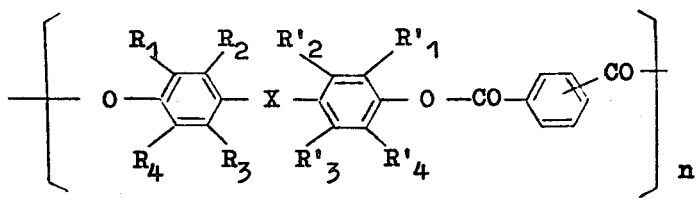

wherein X is —O—, —S—, —SO—, —SO$_2$—, an alkylene group (e.g., having 1 to about 7 carbon atoms) or an alkylidene group (e.g., having 1 to about 7 carbon atoms); $R_1$, $R_2$, $R_3$, $R_4$, $R_1'$, $R_2'$, $R_3'$ and $R_4'$, which may be the same or different, each is a hydrogen atom, a chlorine atom, a bromine atom or a hydrocarbon group having 1 to 6 carbon atoms and $n$ is a positive integer which provides a resinous product;

b. the poly(ethylene oxybenzoate) is present in an amount of from 0.1 to 50 weight % based on the sum of the weight of the aromatic co-polyester and the poly(ethylene oxybenzoate); and c. the

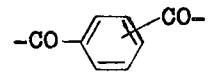

moiety in the above formula is a terephthalic acid unit or an isophthalic acid unit, and is present in the aromatic co-polyester at a molar ratio of 9:1 to 1:9, respectively, useful as a composition for producing molded articles having improved cracking and crazing resistance.

DETAILED DESCRIPTION OF THE INVENTION

The aromatic co-polyesters of this invention are resins prepared from bisphenols selected from the group consisting of bisphenols of the general formula:

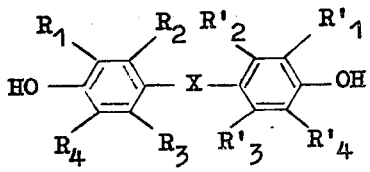

and the functional derivatives thereof, in which —X— is —O—, —S—, —SO—, —SO$_2$—, an alkylene group, and an alkylidene group, $R_1$, $R_2$, $R_3$, $R_4$, $R_1'$, $R_2'$, $R_3'$, and $R_4'$, which can be the same or different, each is a member selected from the group consisting of a hydrogen atom, a chlorine atom, a bromine atom and a hydrocarbon group. The number of the carbon atoms of the hydrocarbon can suitably range from 1 to 6. Typical functional derivatives of the bisphenols are the metal salts and the di-esters with an aliphatic monocarboxylic acid having 1 to 3 carbon atoms. More preferred functional derivatives of the bisphenols are the sodium salts, the potassium salts or diacetate esters thereof. Examples of the bisphenols which can be used in this invention are 4,4'-dihydroxydiphenyl ether, 4,4'-dihydroxy-2,2'-dimethyl-diphenyl ether, 4,4'-dihydroxy-3,3'-dichloro-diphenyl ether, 4,4'-dihydroxydiphenyl thioether, 4,4'-dihydroxy-diphenyl sulfide, 4,4'-dihydroxy-3,3'-dichloro-diphenyl sulfide, 4,4'-dihydroxy-diphenyl sulfone, 4,4'-dihydroxy-3,3'-dichloro-diphenyl sulfone, 4,4'-dihydroxy-diphenyl-methane, 1,1-bis(4-hydroxyphenyl)-ethane, 2,2-bis(4-hydroxyphenyl)-propane, 2,2-bis(4-hydroxy-3,5-dichlorophenyl)-propane, 2,2-bis(4-hydroxy-3,5-dibromophenyl)-propane, 2,2-bis(4-hydroxy-3-methylphenyl)-propane, 1,1-bis(4-hydroxyphenyl)-n-butane, bis(4-hydroxyphenyl)-cyclohexyl-methane, 1,-1-bis(4-hydroxyphenyl)-2,2,2-trichloro-ethane, and the like. Mixtures of such bisphenols can also be used in this invention. Of these bisphenols, 2,2-bis(4-hydroxyphenyl)-propane and 2,2-bis(4-hydroxy-3,5-dibromophenyl)-propane are generally used.

As the acid component which is reacted with the bisphenols to prepare the aromatic co-polyesters of this invention, a mixture of from 90 to 10 mol% of terephthalic acid or the functional derivatives and from 10 to 90 mol% of isophthalic acid or its functional derivatives is used. More preferably, a mixture of from 30 to 70 mol% of terephthalic acid or its functional derivatives and from 70 to 30 mol% of isophthalic acid or its functional derivatives is employed. Aromatic co-polyesters prepared from the bisphenols and a mixture of 50 mol% of terephthalic acid or its functional derivatives and 50 mol% of isophthalic acid or its functional derivatives is most preferred as a standard grade aromatic co-polyester.

As functional derivatives of terephthalic or isophthalic acid, acid-halides such as terephthaloyl or isophthaloyl dichloride and terephthaloyl or isophthaloyl dibromide, and diesters such as the di-alkyl esters having from 1 to 6 carbon atoms, or di-aryl esters, are most preferred. Typical examples thereof are diphenyl terephthalate and diphenyl isophthalate.

The aromatic co-polyesters of this invention can be represented by the formula:

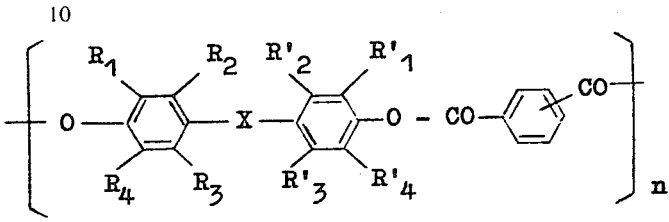

wherein —X— is —O—, —S—, —SO—, —SO$_2$—, an alkylene group, or an alkylidene group, $R_1$, $R_2$, $R_3$, $R_4$, $R_1'$, $R_2'$, $R_3'$, and $R_4'$, which can be the same or different, each is selected from the group, consisting of a hydrogen atom, a chlorine atom, a bromine atom and a hydrocarbon group (the number of carbon atoms of the hydrocarbon group is 1 to 6) and $n$ is an integer, the aromatic co-polyesters preferably having a logarithmic viscosity as hereafter defined of 0.3 to 1.5.

The aromatic co-polyesters of this invention can be prepared by several methods. For example, an interfacial polycondensation process can be used. In this case an aqueous alkaline solution of a bisphenol and a terephthaloyl dihalide-isophthaloyl dihalide mixture dissolved in an organic solvent which is immiscible with water are mixed and reacted. Suitable interfacial polycondensation processes which can be used are disclosed, for example, in W. M. Eareckson, *J. Polymer Sci.*, XL 399 (1959) and Japanese Patent Publication No. 1959/65.

The following is a typical polycondensation process. An aqueous alkali solution of a bisphenol is added to a terephthaloyl dihalide-isophthaloyl dihalide mixture, more preferably a terephthaloyl dichloride-isophthaloyl dichloride mixture, dissolved in an organic solvent, or an organic solvent solution of a terephthaloyl dihalide-isophthaloyl dihalide mixture is added to an aqueous alkaline solution of a bisphenol. Alternatively, an aqueous alkaline solution of a bisphenol and an organic solvent solution of a terephthaloyl dihalide-isophthaloyl dihalide mixture can be simultaneously added to a reaction vessel. Interfacial polycondensation takes place near the interface of the aqueous phase and the organic phase. However, since the aqueous phase and the organic phase essentially are not miscible, it is necessary to mutually disperse the phases. For this purpose an agitator or a mixer such as Homo-mixer can be used.

The concentration of the terephthaloyl dihalide-isophthaloyl dihalide mixture dissolved in the organic solvent is usually from about 2 to 25 weight %, more preferably from 3 to 15 weight %. The concentration of the bisphenol in the aqueous alkaline solution is also usually from about 2 to 25 weight %, more preferably from 3 to 15 weight %.

The amount of the bisphenol and of the terephthaloyl dihalide-isophthaloyl dihalide mixture used (molar ratio) is preferably maintained equivalent. An excess of the terephthaloyl dihalide-isophthaloyl dihalide mixture is not desirable in the preparation of the high molecular weight aromatic co-polyester.

Preferred alkalis are sodium hydroxide and potassium hydroxide. The concentration of the alkali in the aqueous solution can vary widely depending upon the reaction conditions, but is usually in the range from about 0.5 to 10 weight %. It is advantageous if the quantity of alkali is nearly equivalent to the hydroxy groups of the bisphenol used or present in a slight excess. The preferred molar ratio of the alkali to the hydroxy group of the bisphenol is from 1 to 2, most preferably from 1 to 1.1.

As organic solvents which can be used for dissolving the terephthaloyl dihalide-isophthaloyl dihalide mixture, hydrocarbons or halogenated hydrocarbons are used. For example, methylene dichloride, chloroform, tetrachloromethane, 1,2-dichloroethane, 1,1,2-trichloroethane, tetrachloroethane, benzene and methylbenzene can be employed. Especially, preferred are those solvents which also dissolve the aromatic co-polyesters produced. The most preferred solvent is methylene dichloride.

The reaction temperature is not strictly limited, and depends on the solvent used. For example, in the case of methylene dichloride, the reaction temperature is usually preferably below 40°C, with from 5° to 30°C being especially preferred.

Interfacial polymerization is usually conducted at normal pressure and is completed in about 1 to 2 hours.

Antioxidants, dispersing agents, catalysts and viscosity stabilizers can be added to the aqueous alkaline solution or to the reaction mixture, if desired. Typical examples of such agents are as follows. As antioxidants, sodium hydrosulfite or sodium bisulfite can be used. As dispersing agents, anionic surface-active agents such as sodium lauryl sulfate and octadecyl benzene sulfonate, cationic surface-active agents such as cetyl trimethyl ammonium chloride, and nonionic surface-active agents such as poly(ethylene oxide) can be used. As catalysts, quaternary ammonium compounds such as trimethyl benzyl ammonium hydroxide, trimethyl benzyl ammonium chloride and triethyl benzyl ammonium chloride, tertiary sulfonium compounds such as dimethyl-2-hydroxyphenyl sulfonium chloride, quaternary phosphonium compounds such as triphenyl methyl phosphonium iodide and quaternary arsonium compounds such as triphenyl methyl arsonium iodide and trimethyl octyl arsonium iodide can be used. Tertiary ammonium compounds such as trimethyl amine, triethyl amine and benzyl dimethyl amine can also be used as catalysts. As viscosity stabilizers, mono-valent compounds, especially mono-valent phenol compounds such as p-cumyl phenol, o-phenyl phenol, p-phenyl phenol, m-cresol and β-naphthol can be used, if desired.

Another useful method for forming the aromatic co-polyesters is melt polymerization, as disclosed, for example, in A. Conix, Ind. Eng. Chem., 51 147 (1959), in Japanese Patent Publication 15,247/63 and in U.S. Pat. No. 3,395,119.

Melt polymerization can be conducted, for example, by heating and reacting an aliphatic carboxylic acid diester of a bisphenol and a terephthalic acid-isophthalic acid mixture at reduced pressure. A preferred diester of the bisphenol is the diacetate. Melt polymerization can also be conducted by heating and reacting a bislysts such as zinc oxide, lead oxide and antimony dioxide can also be used, however.

Still another method for forming the co-polyesters is solution polymerization, in which the aromatic co-polyesters are prepared by reacting a bisphenol with terephthaloyl dihalide and isophthaloyl dihalide in an organic solvent. Solution polymerizations which can be used are disclosed, for example, in A. Conix, Ind. Eng. Chem., 51 147 (1959), and in U.S. Pat. No. 3,133,898.

In solution polymerization, the bisphenol and the mixture of terephthaloyl dihalide and isophthaloyl dihalide, e.g., terephthaloyl dichloride and isophthaloyl dichloride, are usually mixed in equimolar proportions in an organic solvent, and the mixture is warmed gradually to high temperatures such as about 220°C. As the organic solvent used, those solvents which also dissolve the aromatic co-polyesters produced, such as dichloroethyl benzene, are preferred. Usually, the reaction is carried out in the presence of a base to neutralize the hydrogen halide, e.g., hydrogen chloride, formed.

In order to insure good physical properties and moldability for the aromatic co-polyesters in this invention, the aromatic co-polyesters should have a logarithmic viscosity of from 0.3 to 1.5, more preferably from 0.4 to 0.8. Logarithmic viscosity ($\eta$ inh) is defined by the relationship $$\eta\text{inh} = \frac{\log_e t_1/t_2}{C}$$

wherein $t_1$ is the falling time (in seconds) of the polymer solution; $t_2$ is the falling time (in seconds) of the solvent; and C is the concentration (in g/dl) of the polymer in the solution. The logarithmic viscosity in this invention is determined in a 1,1,2,2-tetrachloroethane-phenol mixture (weight ratio = 4/6) at 25°C.

The poly(ethylene-p-oxybenzoate) as is employed in this invention can be prepared using any known method. Poly(ethylene oxybenzoate) (hereinafter designated as PEOB) has a repeating unit substantially represented by the formula:

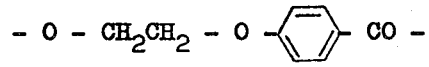

PEOB can be partially substituted with other repeating units, e.g., an ethylene terephthalate unit. Furthermore, PEOB can be used in combination with other polymers, e.g., polyethylene terephthalate. A preferred PEOB as is used in this invention has an intrinsic viscosity ($[\eta]$) of from 0.3 to 1.3, more preferably from 0.5 to 1.1. The intrinsic viscosity is defined by the relationship $$[\eta] = \lim_{c \to 0} \frac{t_1/t_2 - 1}{C}$$

where $t_1$, $t_2$ and $C$ are as hereinbefore defined. The quantity of PEOB added to the aromatic co-polyester in this invention can be varied within the range of from 0.1 to 50%, more preferably from 0.5 to 30% by weight, based on the sum of the weight of the aromatic co-polyester and the PEOB. Using PEOB in an amount above 5 weight %, the hydrolysis resistance, cracking phenol and a mixture of a diaryl ester of terephthalic acid and isophthalic acid. A typical diaryl ester is the diphenyl ester. The reaction temperature employed is in the range of from about 150° to 350°C, more preferably from 180° to 320°C. The reaction pressure is usually varied during the course of the reaction from atmospheric pressure at the early part of the reaction to reduced pressure, such as below 0.02 mmHg, toward the end of the reaction.

In melt polymerization, the molar ratio of the bisphenol and the mixture of terephthalic acid-isophthalic acid components to prepare a high molecular weight aromatic co-polyester must be maintained exactly equivalent.

A number of catalysts can be used. Catalysts which are preferably used are titanium compounds, such as butyl orthotitanate and titanium dioxide. Other cata- and crazing resistance and moldability are also improved.

Hydrolysis in a polyester resin generally occurs under conditions in which the polyester resin contacts water and follows a reduction in molecular weight. Therefore, the degree of hydrolysis can be detected by the change in the molecular weight, i.e., change in the intrinsic viscosity $\eta$inh. Moreover, as a result of the hydrolysis of the resin, various physical properties, e.g., breaking strength, impact strength, bending strength, etc., are reduced.

The term "improved moldability" means that molding can be carried out under mild conditions due to reduced melt viscosity and improved polymer flow.

Using PEOB in an amount of rom 0.1 to 5 weight %, "crazing" is effectively prevented and other properties and advantages of the aromatic co-polyester are fully maintained even at such small amounts.

It is suprizing that crazing of the aromatic co-polyester in this invention could be so substantially improved by the incorporation of such a small amount of PEOB.

When a great improvement in the resistance to cracking and hydrolysis, in the moldability of the aromatic co-polyester and in crazing is required, PEOB is added to the aromatic co-polyester in an amount of from 5 to 30 weight %.

As is shown in Table 1 below, upon adding PEOB to the aromatic co-polyester of the present invention in an amount less than 50 weight %, the tensile strength, bending strength or impact strength do not differ essentially from an aromatic copolyester which does not contain PEOB. The heat distortion temperature is somewhat reduced while the molding capability is greatly improved. "Crazing" is not encountered.

The effects of PEOB at varying amounts are tabulated in Table 1. The aromatic co-polyester in Table 1 was prepared by interfacial polycondensation using 2,2-bis(4-hydroxyphenyl)-propane and a terephthaloyl dichloride-isophthaloyl dichloride mixture (molar ratio of terephthaloyl dichloride to isophthaloyl dichloride of 1:1) as follows.

120 l of an aqueous solution containing 5.51 Kg of 2,2-bis(4-hydroxyphenyl)-propane, 184.7 g of o-phenyl phenol, 2.13 Kg of sodium hydroxide, 27.5 g of sodium hydrosulfite and 45 ml of an aqueous solution of trimethyl benzyl ammonium chloride [containing 0.5 weight % of trimethyl benzyl ammonium chloride to 2,2-bis(4-hydroxy phenyl)-propane] was prepared and maintained at 14°C. 60 l of a methylene dichloride solution containing 2.45 Kg of terephthaloyl dichloride and 2.45 Kg of isophthaloyl dichloride was prepared and also maintained at 14°C. Both solutions were simultaneously poured into a 200 l-glass-lined vessel equipped with a stirrer over a 60 second period. The mixture was stirred and the temperature maintained at 20°C. After 2 hours of reaction, the methylene dichloride phase was separated by centrifugal separation. The resulting methylene dichloride solution was washed three times by vigorously stirring the solution with an equal volume of water, and then filtered. The aromatic copolyester was separated by evaporation of the methylene dichloride from the solution using a kneader at about 40°C. The separated aromatic co-polyester was then washed with hot water at 80°C to remove occluded methylene dichloride and dried at 120°C. The logarithmic viscosity of the aromatic co-polyester was 0.60, determined as earlier described.

The PEOB in Table 1 was prepared by A-TELL Co. Ltd., and the intrinsic viscosity thereof was 0.51, determined as earlier described.

Table 1

Mechanical Properties and Injection Molding Conditions of Various Aromatic Co-polyester/PEOB Systems

| Evaluation | Composition [Aromatic co-polyester : Poly(ethylene oxybenzoate)] | | | | | | | |
|---|---|---|---|---|---|---|---|---|
| | 100:0 | 90:10 | 80:20 | 70:30 | 60:40 | 50:50 | 40:60 | 30:70 |
| Retention of $\eta$inh[1] (%) | 80 | 97 | 98 | 99 | 99 | 99 | 99 | 99 |
| Tensile Strength[2] (Kg/cm$^2$) | 710 | 680 | 670 | 660 | 640 | 620 | 560 | 520 |
| Bending Strength[3] (Kg/cm$^2$) | 760 | 780 | 740 | 710 | 660 | 640 | 580 | 560 |
| Impact Strength[4] (Kg.cm/cm) | 6.8 | 7.5 | 7.9 | 7.4 | 7.0 | 6.3 | 5.4 | 4.3 |
| Heat Distortion[5] Temperature (°C) | 171 | 165 | 162 | 156 | 153 | 142 | 121 | 108 |
| Molding Conditions | | | | | | | | |
| Molding Temperature (°C) | 320 | 300 | 280 | 280 | 260 | 260 | 260 | 260 |
| Injection Pressure (Kg/cm$^2$) | 1300 | 1070 | 1050 | 1000 | 1000 | 760 | 760 | 760 |
| Mold Temperature (°C) | 120 | 90 | 90 | 90 | 90 | 80 | 80 | 80 |

[1] The molding is immersed in hot water at 80°C for 5 days;

Retention of $\eta$inh (%) = $\frac{\eta \text{inh (treated)}}{\eta \text{inh (untreated)}} \times 100$

[2] ASTM D-638-6T Type 1
[3] ASTM D-790-61 $\gamma = 0.05$
[4] ASTM D-256-56T
[5] ASTM D-648 18.5 Kg/cm$^2$ The addition of PEOB in amounts exceeding 50 weight % is usually not desirable. In this case, it has been ascertained that while the polymer flow becomes good so that molding can be carried out under mild conditions, many molding sinks occur on the surface of the molded articles and the mechanical properties, such as tensile, bending or impact strength, are markedly reduced.

To add PEOB to the aromatic co-polyesters of this invention, any well known mixing technique can be used. For example, granules or powders of these two components can be mixed and blended using a V-blender, Henschel mixer, Super mixer or Kneader, and then the mixture immediately molded. Alternatively, the mixture can be formed into pellets after melting using an extruder, a cokneader, an intensive mixer or the like, and then molded. The pelletizing or molding temperature is generally in the range of from about 250° to 350°C, more preferably 260° to 320°C.

Another addition method comprises adding PEOB to a solution of the aromatic co-polyester and then evaporating off the solvent. As the solvent, those solvents which dissolve the aromatic co-polyester can be used, such as methylene dichloride, tetrachloroethane and chloroform. The most preferred solvent is methylene dichloride.

The most suitable method for any particular system can be chosen depending on the composition and the desired shape and properties of the molded articles to be produced therefrom.

In order to improve the heat resistance, light stability, weatherability or oxidation resistance of the composition or articles produced according to this invention, agents preventing thermal degradation, antioxidants, ultraviolet absorbants and the like can be added thereto, if desired. For example, benzotriazole, aminophenyl benzotriazole, benzophenone, trialkyl phosphates, such as trioctyl phosphate and tributyl phosphate, trialkyl phosphites such as trioctyl phosphite, and triaryl phosphites such as triphenyl phosphite, can be used. These materials are conveniently added to the aromatic co-polyester containing PEOB of this invention at any time prior to molding. Known plasticizers, such as the phthalate esters, e.g., dioctyl terephthalate and dioctyl isophthalate, and colorants, such as carbon black and titanium dioxide, can also be added if desired, in commonly used amounts as are known in this art. Other known polymers, such as polyolefins, e.g., polyethylene, polypropylene, and vinyl type polymers, e.g., polyvinylchloride, polymethylmethacrylate, and polyethylene terephthalate and the like, can also be added, if desired.

The aromatic co-polyesters containing PEOB of this invention can be used to form many useful articles using generally known molding methods such as injection molding, extrusion molding, press molding and the like. Typical examples of final products produced therefrom are films, monofilaments, injection molded materials such as machine parts, automobile parts, electrical parts, vessels and springs. The aromatic co-polyesters containing PEOB of this invention find special use as engineering plastics for various uses which require good properties.

The invention will now be further illustrated by reference to the following examples, in which all parts, percents, ratios and the like are by weight unless otherwise stated. This invention is not, however, to be construed as being limited to these examples.

EXAMPLE 1

An aromatic co-polyester was prepared by interfacial polycondensation as follows.

To a 200 l-stainless vessel equipped with a stirrer, about 100 l of an aqueous alkaline solution which contained 2.04 Kg of sodium hydroxide, 5.51 Kg of 2,2-bis(4-hydroxy phenyl)propane, 27.5 g of sodium hydrosulfite and 45 ml of an aqueous solution of trimethyl benzyl ammonium chloride, which contained 0.5 weight % of trimethyl benzyl ammonium chloride to 2,2-bis(4-hydroxy phenyl)propane, were added, and the system dissolved while stirring and bubbling nitrogen gas through the mixture. To the resulting solution, an aqueous solution in which 102.6 g of ophenyl phenol and 47.2 g of sodium hydroxide were dissolved was added. While the mixed solution was maintained at 14°C, the total volume of the solution was adjusted to 120 l by adding additional water.

On the other hand, 2.45 Kg of terephthaloyl dichloride and 2.45 Kg of isophthaloyl dichloride were dissolved in methylene dichloride in a 150 l-glass lined vessel equipped with a stirrer. The mixture was maintained at 14°C and the total volume of the solution adjusted to 60 l by adding additional methylene dichloride. The molar ratio of terephthaloyl dichloride to the isophthaloyl dichloride was 1:1.

Both solutions were simultaneously poured into a 200 l-glass lined vessel equipped with a stirrer over a period of 60 seconds. The mixture was stirred vigorously at 20°C under atmospheric pressure for 2 hours. The methylene dichloride phase was separated by centrifugal separation. 60 l of water was then added to the methylene dichloride phase, and then acetic acid was added and the pH of the mixture maintained at 4. After 20 minutes of stirring, the methylene dichloride phase was separated and was washed twice with 60 l of water. The methylene dichloride solution, after filtration, was placed in a 100 l-kneader and the aromatic co-polyester was separated from the solution while kneading vigorously and evaporating off methylene dichloride at 40° to 80°C. The aromatic co-polyester separated was washed with hot water at 80°C for 30 minutes to remove occluded methylene dichloride, and then dried at 120°C. The logarithmic viscosity of the aromatic co-polyester was 0.65.

95 parts of this aromatic co-polyester and 5 parts of PEOB powder (made by A-TELL Co. Ltd., $[\eta] = 0.84$) were mixed for 2 hours with a V-blender.

The resulting mixed powder was then dried to a water content below 0.02 weight % at 120°C, and extruded using an extruder (40 m/m$\phi$, L/D = 18) at 300°C and pelletized.

ASTM test pieces as shown in Table 2 were injection molded from the pellets prepared as above. The molding temperature was 300°C, the injection pressure was 1200 Kg/cm$^2$ and the mold temperature was 100°C. The molded products had clear surfaces and were transparent. No molding sinks or flow marks were observed.

The moldings were immersed in hot water at 80°C for 5 hours, and no "crazing" was observed.

On the contrary, molding pieces from the aromatic co-polyester per se required more severe conditions for molding, i.e., a molding temperature of 320°C, an injection pressure of 1,300 Kg/cm$^2$ and a mold temperature of 120°C, and extreme "crazing" occurred under the same conditions as described above. The products were consequently brittle.

The molding pieces of the above aromatic co-polyester containing 5% by weight of PEOB were superior to the molding pieces of the aromatic co-polyester per se in almost all mechanical properties as shown in Table 2, and in moldability and chemical resistance.

Table 2

Mechanical Properties of the Aromatic Co-polyester Before Craze-treatment

| Evaluation | Sample Example 1 Aromatic Co-polyester Containing 5 wt.% of PEOB | Comparison Aromatic Co-polyester without PEOB |
|---|---|---|
| Tensile Strength[1] (Kg/cm$^2$) | 750 | 730 |
| Bending Strength[2] (Kg/cm$^2$) | 785 | 740 |
| Compressive Strength[3] (Kg/cm$^2$) | 970 | 940 |
| Compression Modulus[3] (Kg/cm$^2$) | 21,000 | 19,600 |
| Heat Distortion[4] Temperature (°C) | 168 | 171 |

[1]ASTM D-638-64T Type-I Thickness 3.2 mm
[2]ASTM D-790-66 130$^L$ × 13$^W$ × 6.4$^T$ (mm) γ = 0.05
[3]ASTM D-695-63T 25.4$^L$ × 12.7$^W$ × 12.7$^T$ (mm)
[4]ASTM D-648-56 127$^L$ × 12.7$^W$ × 6.3$^T$ (mm)

EXAMPLE 2

97 parts of the aromatic co-polyester powder of Example 1 and 3 parts of PEOB powder (made by A-TELL Co. Ltd.,[η] 0.64) were mixed using a super-mixer for 20 minutes. The blend was dried to a water content below 0.02 weight %, then pelletized as in Example 1. The resulting pellets were injection molded into ASTM test pieces. The molding temperature was 300°C, the injection pressure was 1,230 Kg/cm$^2$ and the mold temperature was 100°C. For comparison, the aromatic co-polyester without PEOB was injection molded into the same type of test pieces under the more severe conditions described in Example 1.

After leaving all of the test pieces at 60°C, 95% relative humidity for 20 days, serious crazing was observed in the molding pieces of the aromatic co-polyesters without the PEOB. On the contrary, crazing was not observed in the test pieces containing 3 parts of PEOB.

Several mechanical property tests were performed and the variation of ηinh were measured on these test pieces before and after the crazing treatment described above. The results obtained are shown in Table 3.

The test pieces from the aromatic co-polyester without the PEOB almost all broke during the testing after the crazing treatment or showed reduced mechanical properties and the ηinh was decreased greatly, but the test pieces which were prepared according to this invention after the crazing treatment retained their excellent properties and only a slight decrease in ηinh was observed. Most particularly, the excellent bending recovery of the aromatic co-polyester of this invention was maintained.

Table 3

Mechanical Properties of the Aromatic Co-polyester

| Evaluation | Sample Example 2 Aromatic Co-polyester Containing 3 wt.% of PEOB | | Comparison Aromatic Co-polyester without PEOB | |
|---|---|---|---|---|
| | Untreated[1] | Treated | Untreated[1] | Treated |
| Tensile Strength[2] (Kg/cm$^2$) | 755 | 750 | 730 | 600 |
| Bending Strength[3] (Kg/cm$^2$) | 795 | 790 | 740 | Broken |
| Modulus of Bending[3] (Kg/cm$^2$) | 19,400 | 19,300 | 18,400 | Broken |
| Recovery Ratio after Bending (%) | 100 | 99 | 100 | Broken |
| Impact Strength[4] (Kg.cm/cm) | 8.8 | 8.7 | 8.6 | 3.4 |
| Heat Distortion[5] Temperature (°C) | 169 | 169 | 171 | 171 |
| ηinh | 0.63 | 0.62 | 0.63 | 0.55 |

[1]Not subjected to crazing treatment
[2]ASTM D-638-64T Type-I Thickness 3.2 mm
[3]ASTM D-790-66 130$^L$ × 13$^W$ × 6.4$^T$ (mm) γ = 0.05
[4]ASTM D-256-56 63.5$^L$ × 12.7$^W$ × 12.7$^T$ (mm) Notch: 45°, 2.5 mm deep, 0.245 mm rad.
[5]ASTM D-648-56 127$^L$ × 12.7$^W$ × 6.3$^T$ (mm)

EXAMPLE 3

The crack resistance test was performed on the ASTM test pieces (ASTM D-790-66, $130^L \times 13^W \times 6.4^T$ (mm), $\gamma = 0.05$) which were prepared in Example 1.

The test pieces were each placed an two supports in which the span distance between the supports was 10 cm, and a strain was provided at the center of the test pieces, the maximum fiber strain being 0.9%. The crack resistance test was carried out by setting the test pieces in a hot air oven, the temperature being maintained at 120°C. 3 hours later the resulting test pieces were removed, and the number of test pieces in which cracking occurred per 50 test pieces tested was measured. The results obtained are shown in Table 4.

Table 4

Crack Resistance of the Aromatic Co-polyester

| Evaluation | Sample Example 3 Aromatic Co-polyester Containing 5 wt.% of PEOB | Comparison Aromatic Co-polyester without PEOB |
|---|---|---|
| Number of Test Pieces in which Cracking Occurred | 0 | 37 |

As is apparent from the results in Table 4, cracking was observed on almost all of the test pieces produced from the aromatic copolyester without PEOB. On the contrary, cracking was not at all observed on the test pieces produced from the aromatic co-polyester containing 5% by weight of PEOB.

EXAMPLE 4

Aromatic co-polyester pellets containing PEOB were prepared as described in Example 1 except for using 99 parts of the aromatic co-polyester powder as described in Example 1 and 1 part of PEOB powder. From these pellets ASTM dumbbell test pieces (ASTM D-638-64T, Type-I, Thickness 3.2 mm) were injection molded. The molding temperature was 310°C, the mold temperature was 110°C and the injection pressure was 1,200 Kg/cm². A crazing treatment for the dumbbell test pieces was carried out as described in Example 1. Crazing was not observed and no change in the $\eta$inh was observed.

The mechanical properties, electrical properties and thermal properties of the dumbbell test pieces were essentially equal to those formed of an aromatic co-polyester which did not contain PEOB.

EXAMPLE 5

An aromatic co-polyester was prepared by interfacial polycondensation as described in Example 1, except for using 4.92 Kg of 4,4'-dihydroxy-diphenylether. The aromatic co-polyester had a logarithmic viscosity of 0.67.

95 parts of this aromatic co-polyester and 5 parts of PEOB powder (made by A-TELL Co., $[\eta] = 0.70$) were mixed for 2 hours using a V-blender.

The resulting mixed powder was then dried to a water content below 0.02 weight % at 120°C, and extruded using an extruder (40 m/m$\phi$, L/D = 18) at 300°C and then pelletized.

ASTM test pieces as shown in Table 5 were injection molded from the pellets prepared as above. The molding temperature was 280°c, the injection pressure was 1,200 Kg/cm² and the mold temperature was 100°C. The molded product had clear surfaces and were transparent. No sinks and flow marks were observed.

The moldings were immersed in hot water at 80°C for 5 days, and no crazing was observed.

On the contrary, molding pieces produced from the aromatic co-polyester per se required more severe conditions for molding, i.e., a molding temperature of 300°C, an injection pressure of 1,300 Kg/cm² and a mold temperature of 120°C, and extreme crazing occurred under the same conditions as described above. The products were consequently brittle.

The molding pieces of the above aromatic co-polyester containing 5% by weight of PEOB were superior to the molding piece of the aromatic co-polyester per se in almost all mechanical properties as shown in Table 5, and in moldability and chemical resistance.

Table 5

Mechanical Properties of the Aromatic Co-polyester before Craze-treatment

| Evaluation | Sample Example 5 Aromatic Co-polyester Containing 5 wt.% of PEOB | Comparison Aromatic Co-polyester without PEOB |
|---|---|---|
| Tensile Strength[1] (Kg/cm²) | 750 | 720 |
| Bending Strength[2] (Kg/cm²) | 770 | 730 |
| Compression Strength[3] (Kg/cm²) | 960 | 930 |
| Compression Modulus[3] (Kg/cm²) | 20,100 | 18,600 |
| Heat Distortion[4] Temperature (°C) | 165 | 169 |

[1]ASTM D-638-647 Type-I Thickness 3.2 mm
[2]ASTM D-790-66 $130^L \times 13^W \times 6.4^T$ (mm) $\gamma = 0.05$
[3]ASTM D-695-637 $25.4^L \times 12.7^W \times 12.7^T$ (mm)
[4]ASTM D-648-56 $127^L \times 12.7^W \times 6.3T$ (mm)

EXAMPLE 6

On the test pieces which were prepared in Example 5, the changes in several mechanical properties and the properties and the intrinsic viscosity before and after the crazing treatment, and crack resistance were measured. The results obtained are shown in Tables 6 and 7, respectively. On the test pieces produced from the aromatic co-polyester containing 5% by weight of PEOB, no crazing was observed and a reduction in the intrinsic viscosity was substantially not observed. On the contrary, crazing was greatly observed and an extreme reduction in the intrinsic viscosity also occurred on the test pieces from the aromatic co-polyester without the PEOB.

Further, essentially no reduction in the mechanical properties after the crazing treatment observed on those test pieces produced from the aromatic co-polyester containing 5 weight % of PEOB. On the other hand, on those produced from the aromatic copolyester without the PEOB, an extreme reduction in the mechanical properties occurred.

Still further, the test pieces from the aromatic co-polyester containing 5% by weight of PEOB were superior to the test pieces from the aromatic co-polyester per se in crack resistance.

for using 5.30 Kg of 4,4'-dihydroxydiphenyl thioether. The aromatic co-polyester had a logarithmic viscosity of 0.65.

95 parts of this aromatic co-polyester and 5 parts of PEOB powder (made by A-TELL Co. Ltd., $[\eta] = 0.84$) were mixed for 2 hours with a V-blender.

The resulting mixed powder was then dried to a water content below 0.02 weight % at 120°C, and extruded using an extruder (40 m/m$\phi$, L/D = 18) at 300°C and pelletized.

ASTM test pieces as shown in Table 8 were injection molded from the pellets prepared as above. The molding temperature was 280°C, the injection pressure was 1,200 Kg/cm$^2$ and the mold temperature was 100°C.

The molded products had clear surfaces and were transparent. No molding sinks or flow marks were observed.

The moldings were immersed in hot water at 80°C for 5 days, and no "crazing" was observed.

On the contrary, molding pieces from the aromatic copolyester per se required more severe conditions for molding, i.e., a molding temperature of 300°C, an injection pressure of 1,300 Kg/cm$^2$ and a mold temperature of 120°C, and extreme "crazing" occurred under the same conditions as described above. The products Table 6

Mechanical Properties of the Aromatic Co-polyester

| Evaluation | Sample | | | |
|---|---|---|---|---|
| | Example 6 Aromatic Co-poly-[6] ester Containing 5 wt.% of PEOB | | Comparison Aromatic Co-poly-ester without PEOB | |
| | Untreated[1] | Treated | Untreated | Treated |
| $\eta$inh | 0.64 | 0.63 | 0.64 | 0.51 |
| Tensile Strength[2] (Kg/cm$^2$) | 750 | 745 | 720 | 680 |
| Bending Strength[3] (Kg/cm$^2$) | 770 | 760 | 730 | Broken |
| Modulus of Bending[3] (Kg/cm$^2$) | 19,000 | 19,000 | 18,200 | Broken |
| Recovery Ratio after Bending (%) | 100 | 99 | 100 | Broken |
| Impact Strength[4] (Kg.cm/cm) | 8.9 | 8.7 | 8.5 | 3.1 |
| Heat Distortion[5] Temperature (°C) | 165 | 164 | 169 | 167 |

[1] Not subjected to crazing treatment
[2] ASTM D-638-64T Type-I Thickness 3.2 mm
[3] ASTM D-790-66 130$^L$ × 13$^W$ × 6.4$^T$ (mm) $\gamma = 0.05$
[4] ASTM D-256-56 63.5$^L$ × 12.7$^W$ × 12.7$^T$ (mm) Notch; 45°, 2.5 mm deep, 0.245 mm rad.
[5] ASTM D-648-56 127$^L$ × 12.7$^W$ × 6.3$^T$ (mm)
[6] Prepared as in Example 5

Table 7

Crack Resistance of the Aromatic Co-polyester

| Evaluation | Sample | |
|---|---|---|
| | Example 6 Aromatic Co-poly-ester Containing 5 wt.% of PEOB | Comparsion Aromatic Co-poly-ester without PEOB |
| Number of Test Pieces in which Cracking Occurred[1] | 0 | 33 |

EXAMPLE 7

An aromatic co-polyester was prepared by interfacial polycondensation as described in Example 1, except consequently were brittle.

The molding pieces from the above aromatic co-polyester containing 5% by weight of PEOB were superior to the molding pieces from the aromatic co-polyester per se in almost all mechanical properties as shown in Table 9, moldability and chemical resistance.

Table 8

Mechanical Properties of the Aromatic Co-polyester before Craze-treatment

| Evaluation | Sample | |
|---|---|---|
| | Example 7 Aromatic Co-polyester Containing 5 wt.% of PEOB | Comparison Aromatic Co-polyester without PEOB |
| Tensile Strength[1] (Kg/cm$^2$) | 750 | 720 |
| Bending Strength[2] (Kg/cm$^2$) | 760 | 730 |
| Compressive Strength[3] (Kg/cm$^2$) | 970 | 930 |
| Compression Modulus[3] (Kg/cm$^2$) | 21,000 | 18,800 |
| Heat Distortion[4] Temperature (°C) | 166 | 170 |

[1]ASTM D-638-64T Type-I Thickness 3.2 mm
[2]ASTM D-790-66 130$^L$ × 13$^W$ × 6.4$^T$ (mm) γ = 0.05
[3]ASTM D-695-63T 25.4$^L$ × 12.7$^W$ × 12.7$^T$ (mm)
[4]ASTM D-648-56 127$^L$ × 12.7$^W$ × 6.3$^T$ (mm)

EXAMPLE 8

The changes in several mechanical properties and the intrinsic viscosity before and after the crazing treatment, and the crack resistance were measured on the test pieces which were prepared in Example 7. The results obtained are given in Tables 9 and 10, respectively. On the test pieces from the aromatic copolyester containing 5% by weight of PEOB, no crazing was observed and substantially no reduction in the intrinsic viscosity was observed. On the contrary, on the test pieces from the aromatic co-polyester without PEOB, a large amount of crazing is obtained and an extreme reduction in the intrinsic viscosity also occurred.

Further, on those containing 5 weight % of PEOB, almost no reduction in mechanical properties after the crazing treatment was observed. On the other hand, on those without PEOB, an extreme reduction in mechanical properties occurred.

Still further, the test pieces from the aromatic co-polyester containing 5% by weight of PEOB were superior to the test pieces from the aromatic co-polyester per se in crack resistance.

EXAMPLE 9

An aromatic co-polyester was prepared by interfacial polycondensation as described in Example 1, except for using 6.17 Kg 4,4'dihydroxydiphenyl sulfone. The aromatic co-polyester had a logarithmic viscosity of 0.68.

The aromatic co-polyester obtained was dissolved in methylene dichloride, with the concentration of aromatic co-polyester being about 10 weight %. To this aromatic co-polyester solution 20-mesh PEOB powder (made by A-TELL Co. Ltd., [η] = 0.69) was added to provide a slurry. The weight ratio of the aromatic co-polyester and the PEOB was 93:7. With vigorous stirring, acetone at twice the volume of the methylene dichloride solution was added to the slurry and the aromatic co-polyester containing PEOB was precipitated as a powder. The precipitated polymer was washed with hot water and dried to a water content of below 0.02 weight %. Using powder, ASTM test pieces were injection molded, with the molding temperature being 300°C, the injection pressure being 1,160 Kg/cm$^2$, and the mold temperature being 110°C. The resulting test pieces were tested using the same crazing treatment as described in Example 1. Crazing was not observed. Several of the mechanical properties of the test pieces Table 9

Mechanical Properties of the Aromatic Co-polyester

| Evaluation | Sample | | | |
|---|---|---|---|---|
| | Example 8 Aromatic Co-poly-[6] ester Containing 5 wt.% of PEOB | | Comparison Aromatic Co-polyester without PEOB | |
| | Untreated[1] | Treated | Untreated[1] | Treated |
| ηinh | 0.65 | 0.64 | 0.65 | 0.62 |
| Tensile Strength[2] (Kg/cm$^2$) | 750 | 740 | 720 | 670 |
| Bending Strength[3] (Kg/cm$^2$) | 760 | 780 | 730 | Broken |
| Modulus of Bending[3] (Kg/cm$^2$) | 19,400 | 19,300 | 19,000 | Broken |
| Recovery Ratio after | | | | |

Table 9—Continued

Mechanical Properties of the Aromatic Co-polyester

| Evaluation | Example 8 Aromatic Co-poly-[6] ester Containing 5 wt.% of PEOB | | Comparison Aromatic Co-poly- ester without PEOB | |
|---|---|---|---|---|
| | Untreated[1] | Treated | Untreated[1] | Treated |
| Bending (%) | 100 | 99 | 100 | Broken |
| Impact Strength[4] (Kg.cm/cm) | 8.5 | 8.3 | 8.2 | 3.0 |
| Heat Distortion[5] Temperature (°C) | 166 | 164 | 170 | 169 |

[1] Not subjected to crazing treatment
[2] ASTM D-638-64T Type-I Thickness 3.2 mm
[3] ASTM D-790-66 130$^L$ × 13$^W$ × 6.4$^T$ (mm) = 0.05
[4] ASTM D-256-56 63.5$^L$ × 12.7$^W$ × 12.7$^T$ (mm) Notch; 45°, 2.5 mm deep, 0.245 mm rad.
[5] ASTM D-648-56 127$^L$ × 12.7$^W$ × 6.3$^T$ (mm)
[6] Prepared as in Example 7

Table 10

Crack Resistance of the Aromatic Co-polyester

| Evaluation | Example 8 Aromatic Co-poly-[2] ester Containing 5 wt.% of PEOB | Comparison Aromatic Co!poly- ester without PEOB |
|---|---|---|
| Number of Test Pieces in which Cracking Occurred[1] | 0 | 32 |

[1] Treated as in Example 3;
[2] Prepared as in Example 7 either before or after the crazing treatment described above are given in Table 11, as compared to samples without PEOB.

Table 11

Mechanical Properties of the Aromatic Co-polyester

| Evaluation | Example 9 Aromatic Co-poly- ester Containing 7 wt.% of PEOB | | Comparison Aromatic Co-poly- ester without PEOB | |
|---|---|---|---|---|
| | Untreated[1] | Treated | Untreated[1] | Treated |
| $\eta$inh | 0.68 | 0.67 | 0.68 | 0.52 |
| Tensile Strength[2] (Kg/cm$^2$) | 770 | 760 | 800 | 600 |
| Bending Strength[3] (Kg/cm$^2$) | 780 | 780 | 800 | Broken |
| Modulus of Bending[3] (Kg/cm$^2$) | 20,000 | 19,800 | 20,100 | Broken |
| Recovery Ratio after Bending (%) | 100 | 99 | 100 | Broken |
| Impact Strength[4] (Kg.cm/cm) | 8.9 | 8.7 | 8.7 | 5.0 |
| Retention of Impact Strength (%) | — | 98 | — | 58 |

[1] Not subjected to crazing treament
[2] ASTM D-638-64T Type-I Thickness 3.2 mm
[3] ASTM D-790-66 130$^L$ × 13$^W$ × 6.4 $^T$ (mm) $\gamma$ = 0.05
[4] ASTM D-256-56 63.5$^L$ × 12.7$^W$ × 12.7$^T$ (mm) Notch 45°, 2.5 mm deep, 0.245 mm rad.

On the test pieces from the aromatic co-polyester containing 7% by weight of PEOB, almost no reduction in the intrinsic viscosity after the crazing treatment was observed. On the contrary, on those from the aromatic co-polyester per se, an extreme reduction in intrinsic viscosity was observed.

Further, the crack resistance test was conducted in the same way as described in Example 3. No cracking occurred on the test pieces from the aromatic co-polyester containing 7% by weight of PEOB. On the contrary, on almost all of those of the aromatic co-polyester per se, cracking was observed.

EXAMPLES 10–14

An aromatic co-polyester was prepared by interfacial polycondensation as described in Example 1 except for using an aqueous solution containing 153.9 g of o-phenyl phenol and 70.8 g of sodium hydroxide. The molar ratio of the terephthaloyl dichloride to the isophthaloyl dichloride was 1:1. The aromatic co-polyester prepared had a logarithmic viscosity of 0.60

The resulting aromatic co-polyester and PEOB (made by A-TELL Co. Ltd., $[\eta] = 0.64$) were mixed for 20 minutes in a Supermixer using varying amounts of PEOB, i.e., 0, 3, 5, 10, 20 and 30 parts, respectively. The resulting mixed powders were dried to a water content below 0.02 weight % at 120°C, and then extruded at 300°C and pelletized. The melt viscosity of the pellets was determined at 300°C or 320°C using a Flow-tester. The results obtained are shown in Table 12. The aromatic co-polyesters containing PEOB of this invention have a reduced melt viscosity as compared with the aromatic co-polyester without the PEOB.

Several of the mechanical properties of ASTM test pieces injection molded from these pellets are listed in Table 13. The conditions of the injection molding of the aromatic co-polyesters containing PEOB were: a molding temperature of 300°C, an injection pressure of 1,200 Kg/cm² and a mold temperature of 110°C. For the aromatic co-polyester without PEOB, the molding temperature was 320°C, the injection pressure was 1,300 Kg/cm² and the mold temperature was 120°C. The aromatic co-polyesters containing PEOB, i.e., Examples 10 to 14, maintained good mechanical properties and crazing was not observed after they were subjected to the crazing treatment described in either Example 1 or Example 2.

propane and a diphenyl terephthalate-diphenyl isophthalate mixture.

9.54 Kg of diphenyl terephthalate, 6.36 Kg of diphenyl isophthalate, the molar ratio of the diphenyl terephthalate to the diphenyl isophthalate being 6:4, 11.4 Kg of 2,2-bis(4-hydroxy phenyl)propane and 0.2 Kg of potassium borohydride were placed in a 50 l stainless steel autoclave equipped with a stirrer and a nitrogen inlet tube. The mixture was heated to 200°C under a dry nitrogen flow at atmospheric pressure. After 1 hour, the nitrogen flow was stopped and the pressure was reduced to 10 mmHg. The reaction temperature was then gradually increased to 280°C over a 30 minute period, while phenol was continuously bled from the reaction vessel. One hour after the pressure was reduced to 0.2 mmHg the temperature was increased to 300°C. The reaction mixture was maintained at these conditions for 4 hours. The reaction mixture was then purged with dry nitrogen and cooled to room temperature. The polymer was removed and crushed into a powder. The aromatic co-polyester powder prepared was dissolved in 200 l of methylene-dichloride and filtered, and then 200 l of acetone was poured into the polymer solution. The precipitated aromatic co-polyester was separated and washed with water, then dried at 120°C for 20 hours.

Table 12

Melt Viscosity of Aromatic Co-polyesters Containing PEOB and Without PEOB

| Example | Composition Aromatic Co-polyester : PEOB | Temperature (°C) | Shear Stress (dyne/cm²) | Melt Viscosity (poise) |
|---|---|---|---|---|
| 10 | 97 : 3 | 320 | $6 \times 10^6$ | $2.5 \times 10^4$ |
| 11 | 95 : 5 | 320 | $6 \times 10^6$ | $1.6 \times 10^4$ |
| 12 | 90 : 10 | 320 | $6 \times 10^6$ | $9.6 \times 10^3$ |
| 13 | 80 : 20 | 320 | $6 \times 10^6$ | $4.8 \times 10^3$ |
| 14 | 70 : 30 | 320 | $6 \times 10^6$ | $3.1 \times 10^3$ |
| Aromatic Co-polyester Only | 100 : 0 | 320 | $6 \times 10^6$ | $4.0 \times 10^4$ |
| 10 | 97 : 3 | 300 | $6 \times 10^6$ | $4.3 \times 10^4$ |
| 11 | 95 : 5 | 300 | $6 \times 10^6$ | $3.4 \times 10^4$ |
| 12 | 90 : 10 | 300 | $6 \times 10^6$ | $2.0 \times 10^4$ |
| 13 | 80 : 20 | 300 | $6 \times 10^6$ | $8.7 \times 10^3$ |
| 14 | 70 : 30 | 300 | $6 \times 10^{106}$ | $5.8 \times 10^3$ |
| Aromatic Co-polyester only | : 0 | 300 | $6 \times 10^6$ | $6.5 \times 10^4$ |

Table 13

Mechanical Properties of Aromatic Co-polyesters Containing PEOB and Without PEOB

| Example | Composition Aromatic Co-polyester : PEOB | Tensile[1] Strength (Kg/cm²) | Bending[2] Strength (Kg/cm²) | Impact[3] Strength (Kg.cm/cm) | Heat Dis-[4] tortion Temperature (°C) |
|---|---|---|---|---|---|
| 10 | 97 : 3 | 745 | 775 | 6.8 | 168 |
| 11 | 95 : 5 | 750 | 785 | 6.8 | 166 |
| 12 | 90 : 10 | 690 | 765 | 7.3 | 162 |
| 13 | 80 : 20 | 675 | 730 | 7.8 | 158 |
| 14 | 70 : 30 | 655 | 705 | 6.8 | 151 |
| Aromatic Co-polyester Only | 100 : 0 | 705 | 760 | 6.5 | 171 |

[1]ASTM D-638-64T Type-I Thickness 3.2 mm
[2]ASTM D-790-66 130$^L$ × 13$^W$ × 6.4$^T$ (mm) $\gamma = 0.05$
[3]ASTM D-256-56 63.5$^L$ × 12.7$^W$ × 12.7$^T$ (mm) Notch; 45°, 2.5 mm deep, 0.245 mm rad.
[4]ASTM D-648-56 127$^L$ × 12.7$^W$ × 6.3$^T$ (mm)

EXAMPLES 15–17

An aromatic co-polyester powder was prepared by melt polymerization from 2,2-bis(4-hydroxy phenyl)-

The logarithmic viscosity of the aromatic co-polyester powder prepared was 0.63.

The aromatic co-polyester powder and PEOB (made by A-TELL Co. Ltd., $[\eta] = 0.64$) were added to a vesel. The mixture was stirred at 290°C, while passing dry nitrogen gas therethrough for 10 minutes. The resulting melt was pelletized. The ASTM test pieces were injection molded from these pellets as described in Examples 12 – 16.

The melt viscosity of the pellets and the mechanical properties of the test pieces are listed in Tables 14 and 15. The aromatic co-polyesters containing PEOB had a reduced melt viscosity and essentially retained the excellent mechanical properties of the aromatic co-polyester. Crazing was not observed after the crazing treatment as described in Example 1.

Table 14

| Example | Melt Viscosity of the Aromatic Co-polyester Containing PEOB and Without PEOB | | | |
|---|---|---|---|---|
| | Composition Aromatic Co-polyester : PEOB | Temperature | Shear Stress | Melt Viscosity |
| | | (°C) | (dyne/cm²) | (poise) |
| 15 | 90 : 10 | 320 | $6 \times 10^6$ | $1.3 \times 10^4$ |
| 16 | 80 : 20 | 320 | $6 \times 10^6$ | $7.6 \times 10^3$ |
| 17 | 70 : 30 | 320 | $6 \times 10^6$ | $3.8 \times 10^3$ |
| Aromatic Co-polyester Only | 100 : 0 | 320 | $6 \times 10^6$ | $4.5 \times 10^4$ |
| 15 | 90 : 10 | 300 | $6 \times 10^6$ | $2.3 \times 10^4$ |
| 16 | 80 : 20 | 300 | $6 \times 10^6$ | $9.3 \times 10^3$ |
| 17 | 70 : 30 | 300 | $6 \times 10^6$ | $6.3 \times 10^3$ |
| Aromatic Co-polyester Only | 100 : 0 | 300 | $6 \times 10^6$ | $7.0 \times 10^4$ |

Table 15

| Example | Mechanical Properties of the Aromatic Co-polyester Containing PEOB and Without PEOB | | | | |
|---|---|---|---|---|---|
| | Composition Aromatic Co-polyester : PEOB | Tensile[1] Strength | Bending[2] Strength | Impact[3] Strength | Heat Distortion[4] Temperature |
| | | (Kg/cm²) | (Kg/cm²) | (Kg.cm/cm) | (°C) |
| 15 | 90 : 10 | 695 | 770 | 7.4 | 163 |
| 16 | 80 : 20 | 685 | 735 | 8.0 | 158 |
| 17 | 70 : 30 | 665 | 715 | 7.3 | 150 |
| Aromatic Co-polyester Only | 100 : 0 | 710 | 765 | 7.2 | 174 |

[1] ASTM D-638-64T Type-I Thickness 3.2 mm
[2] ASTM D-790-66 130$^L$ × 13$^W$ × 6.4$^T$ (mm) $\gamma = 0.05$
[3] ASTM D-256-56 63.5$^L$ × 12.7$^W$ × 12.7$^T$ (mm) Notch 45°, 2.5 mm deep, 0.245 mm rad.
[4] ASTM D-648-56 127$^L$ × 12.7$^W$ × 6.3$^T$ (mm) 18.5 Kg/cm²

EXAMPLE 18

An aromatic co-polyester in which the content of 2,2-bis-(4-hydroxy-3,5-dichloro phenyl)propane was 10 mol% of the sum of the bisphenol units was prepared. The starting materials and amounts were as follows: 120 l of an aqueous alkaline solution which contained 4.97 Kg of 2,2-bis(4-hydroxyphenyl)propane, 0.88 Kg of 2,2-bis(4-hydroxy-3,5-dichlorophenyl)propane, 2.09 Kg of sodium hydroxide, 27.5 g of sodium hydrosulfide, 45 ml of trimethyl benzyl ammonium chloride and 102.6 g of o-phenyl phenol and 60 l of a methylene dichloride solution which contained 2.45 Kg of terephthaloyl dichloride and 2.45 Kg of isophthaloyl dichloride. The molar ratio of the 2,2-bis(4-hydroxyphenyl)propane to the 2,2-bis(4-hydroxy-3,5-dichlorophenyl)propane was 9:1, and the molar ratio of the terephthaloyl dichloride to the isophthaloyl dichloride was 1:1.

The process for the preparation of the aromatic co-polyester was the same as was used in Example 1, except that the reaction time was 3 hours.

The logarithmic viscosity of the aromatic co-polyester was 0.61.

95 parts of this aromatic co-polyester and 5 parts of PEOB powder (made by A-TELL Co. Ltd., [$\eta$] = 0.64) were mixed, pelletized and injection molded as described in Example 1.

Crazing was not observed after a crazing treatment as described in Example 1 or in Example 2.

EXAMPLE 19

An aromatic co-polyester which contained 2,2-bis(4-hydroxy-3,5-dibromo phenyl)propane was prepared as described in Example 18, except 1.31 Kg of 2,2-bis(4-hydroxy-3,5-dibromo phenyl)-propane was used instead of 0.88 Kg of 2,2-bis(4-hydroxy-3,5-dichloro phenyl)propane. The molar ratio of the 2,2-bis(4-hydroxy phenyl)propane to the 2,2-bis(4-hydroxy-3,5-dibromo phenyl)propane was 9:1, and the molar ratio of the terephthaloyl dichloride to the isophthaloyl dichloride was 1:1.

The logarithmic viscosity of the aromatic co-polyester was 0.58.

95 parts of this aromatic co-polyester and 5 parts of a PEOB powder (made by A-TELL Co. Ltd., [$\theta$] = 0.64) were mixed, pelletized and injection molded as described in Example 1.

Crazing was not observed after the crazing treatment as described in Example 1 or in Example 2.

EXAMPLE 20

An aromatic co-polyester was prepared by interfacial polycondensation as described in Example 1, except for using 3.43 Kg of terephthaloyl dichloride and 1.47 Kg of isophthaloyl dichloride, the molar ratio of the terephthaloyl dichloride to the isophthaloyl dichloride being 7:3. The aromatic co-polyester had a logarithmic viscosity of 0.68.

The aromatic co-polyester obtained was dissolved in methylene dichloride, with the concentration of aromatic co-polyester being about 10 weight %. To this aromatic co-polyester solution 20-mesh PEOB powder (made by A-TELL Co. Ltd., [η] = 0.69) was added to provide a slurry. The weight ratio of the aromatic co-polyester to the PEOB was 93:7. With vigorous stirring, acetone at twice the volume of the methylene dichloride solution was added to the slurry and the aromatic co-polyester containing PEOB was precipitated as a powder. The precipitated polymer was washed with hot water and dried to a water content of below 0.02 weight %. Using this powder, ASTM test pieces were injection molded, with the molding temperature being 300°C, the injection pressure being 1160 Kg/cm$^2$, and the mold temperature being 110°C. The resulting test pieces were tested using the same crazing treatment as described in Example 1. Crazing was not observed.

Several of the mechanical properties of the test pieces either before or after the crazing treatment described above are given in Table 16, as compared to samples without PEOB.

EXAMPLE 21

An aromatic co-polyester was prepared by interfacial polycondensation as described in Example 1, except for using 1.47 Kg of terephthaloyl dichloride and 3.43 Kg of isophthaloyl dichloride, the molar ratio of the terephthaloyl dichloride to the isophthaloyl dichloride being 3:7. The aromatic co-polyester obtained had a logarithmic viscosity of 0.70 Injection molded ASTM test pieces were prepared as described in Example 20 using 7 wt.% of PEOB. The physical properties of the moldings thus obtained before and after the crazing treatment are given in Table 17. As is clear from the results in Table 17, for the aromatic co-polyesters containing PEOB, the reduction in viscosity and physical properties after the crazing treatment were substantially not observed. They did not craze after being subjected to the crazing treatment as described in Example 1.

Table 17

Mechanical Properties of the Aromatic Co-polyester

| Evaluation | Sample Example 21 Aromatic Co-polyester Containing 7 wt.% of PEOB | | Comparison Aromatic Co-polyester without PEOB | |
|---|---|---|---|---|
| | Untreated[1] | Treated | Untreated[1] | Treated |
| ηinh | 0.70 | 0.67 | 0.70 | 0.56 |
| Tensile Strength[2] (Kg/cm$^2$) | 740 | 735 | 630 | 600 |
| Bending Strength[3] (Kg/cm$^2$) | 780 | 760 | 740 | Broken |
| Modulus of Bending[3] (Kg/cm$^2$) | 19,150 | 19,100 | 19,000 | Broken |
| Recovery Ratio after Bending (%) | 100 | 99 | 100 | Broken |
| Impact Strength[4] (Kg.cm/cm) | 8.7 | 8.6 | 8.6 | 3.5 |

[1] Not subjected to crazing treatment
[2] ASTM D-638-64T Type-I Thickness 3.2 mm
[3] ASTM D-790-66 130$^L$ × 13$^W$ × 6.4$^T$ (mm) γ = 0.05
[4] ASTM D-256-56 63.5$^L$ × 12.7$^W$ × 12.7$^T$ (mm) Notch; 45°, 2.5 mm deep, 0.245 mm rad.

While the invention has been described in detail and with reference to specific embodiments thereof, it will be apparent to one skilled in the art that various changes and modifications can be made therein with- Table 16

Mechanical Properties of the Aromatic Co-polyester

| Evaluation | Sample Example 20 Aromatic Co-polyester Containing 7 wt.% of PEOB | | Comparison Aromatic Co-polyester (same as Example 20, but without PEOB) | |
|---|---|---|---|---|
| | Untreated[1] | Treated | Untreated[1] | Treated |
| ηinh | 0.68 | 0.67 | 0.68 | 0.52 |
| Tensile Strength[2] (Kg/cm$^2$) | 735 | 730 | 750 | 600 |
| Bending Strength[3] (Kg/cm$^2$) | 780 | 770 | 750 | Broken |
| Modulus of Bending[3] (Kg/cm$^2$) | 19,500 | 19,300 | 19,300 | Broken |
| Recovery Ratio after Bending (%) | 100 | 99 | 100 | Broken |
| Impact Strength[4] (Kg.cm/cm) | 8.8 | 8.6 | 8.7 | 5.0 |
| Retention of Impact Strength (%) | — | 98 | — | 58 |

[1] Not subjected to crazing treatment
[2] ASTM D-638-64T Type-I Thickness 3.2 mm
[3] ASTM D-790-66 130$^L$ × 13$^W$ × 6.4$^T$ (mm) γ = 0.05
[4] ASTM D-256-56 63.5$^L$ × 12.7$^W$ × 12.7$^T$ (mm) Notch 45°, 2.5 mm deep, 0.245 mm rad.

What is claimed is:

1. A composition comprising an aromatic co-polyester and poly(ethylene oxybenzoate), in which
   a. the aromatic co-polyester is a resinous product represented by the formula:

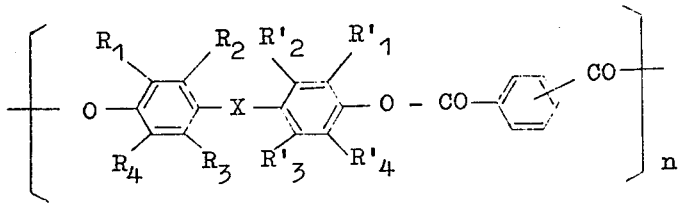

wherein X is —O—, —S—, —SO$_2$—, an alkylene group or an alkylidene group; $R_1$, $R_2$, $R_3$, $R_4$, $R_1'$, $R_2'$, $R_3'$ and $R_4'$ which may be the same or different, each is a hydrogen atom, a chlorine atom, a bromine atom or a hydrocarbon group having 1 to 6 carbon atoms, and $n$ is a positive integer which provides a resinous product;
   b. the poly(ethylene oxybenzoate) is present in an amount of from 0.1 to 50 weight % based on the sum of the weight of said aromatic co-polyester and the poly(ethylene oxybenzoate); and
   c. the

moiety in the above formula is a terephthalic acid unit or an isophthalic acid unit, which is present in said aromatic co-polyester at a molar ratio of 9:1 to 1:9, respectively.

2. The composition as claimed in claim 1, wherein the molar ratio of terephthalic acid units to isophthalic acid units is 7:3 to 3:7.

3. The composition as claimed in claim 1, wherein the molar ratio of terephthalic acid units to isophthalic acid units is substantially 1:1.

4. The composition as claimed in claim 1, containing from 0.1 to 5 weight % of poly(ethylene oxybenzoate).

5. The composition as claimed in claim 1, containing from 5 to 30 weight % of poly(ethylene oxybenzoate).

6. The composition as claimed in claim 1, wherein the molar ratio of terephthalic acid units to isophthalic acid units is substantially 1:1 and containing from 0.1 to 5 weight % of poly(ethylene oxybenzoate).

7. The composition as claimed in claim 1, wherein the molar ratio of terephthalic acid units to isophthalic acid units is substantially 1:1 and containing from 5 to 30 weight % of poly(ethylene oxybenzoate).

8. The composition as claimed in claim 1, wherein the logarithmic viscosity ($\eta$inh) of said aromatic co-polyester is from 0.3 to 1.0.

9. The composition as claimed in claim 1, wherein the intrinsic viscosity [$\eta$] of said poly(ethylene oxybenzoate) is from 0.3 to 1.3.

10. The composition as claimed in claim 1, wherein the molar ratio of terephthalic acid units to isophthalic acid units is substantially 1:1, said poly(ethylene oxybenzoate) is present in an amount of from 0.1 to 5 weight %, said aromatic co-polyester has a logarithmic viscosity ($\eta$inh) of from 0.3 to 1.5 and said poly(ethylene oxybenzoate) has an intrinsic viscosity [$\eta$] of from 0.3 to 1.3.

11. The composition as claimed in claim 1, wherein the molar ratio of terephthalic acid units to isophthalic acid units is substantially 1:1, said poly(ethylene oxybenzoate) is present in an amount of from 5 to 30 weight %, said aromatic co-polyester has a logarithmic viscosity ($\eta$inh) of from 0.3 to 1.5 and said poly(ethylene oxybenzoate) has an intrinsic viscosity [$\eta$] of from 0.3 to 1.3.

12. A composition showing reduced crazing and improved moldability comprising an aromatic co-polyester and poly(ethylene oxybenzoate), in which
   a. the aromatic copolyester is a resinous product represented by the formula:

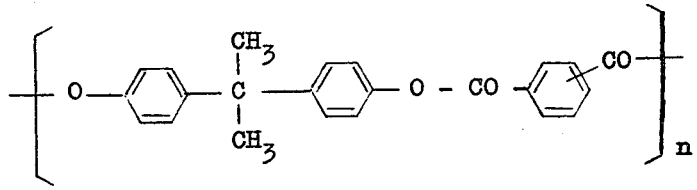

wherein $n$ is a positive integer which provides a resinous product;
   b. the poly(ethylene oxybenzoate) is present in an amount of from 0.1 to 50 weight % based on the sum of the weight of said aromatic co-polyester and the poly(ethylene oxybenzoate); and
   c. the

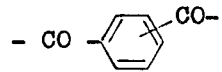

moiety in the above formula is a terephthalic acid unit or an isophthalic acid unit, which is present in said aromatic co-polyester at a molar ratio of 9:1 to 1:9, respectively.

13. The composition as claimed in claim 12, wherein the molar ratio of terephthalic acid units to isophthalic acid units is substantially 1:1.

14. The composition as claimed in claim 12, wherein said aromatic co-polyester has a logarithmic viscosity ($\eta$inh) of from 0.3 to 1.5 and said poly(ethylene oxybenzoate) is present in an amount of from 0.1 to 5%.

15. The composition as claimed in claim 12, wherein said aromatic co-polyester has a logarithmic viscosity ($\eta$inh) of from 0.3 to 1.5 and said poly(ethylene oxybenzoate) is present in an amount of from 5 to 30%.

16. The composition as claimed in claim 12, wherein said aromatic co-polyester has a logarithmic viscosity ($\eta$inh) of from 0.3 to 1.5, said poly(ethylene oxybenzoate) has an intrinsic viscosity [$\eta$] of from 0.3 to 1.3 and said poly(ethylene oxybenzoate) is present in an amount of from 0.1 to 5%.

17. The composition as claimed in claim 12, wherein said aromatic co-polyester has a logarithmic viscosity ($\eta$inh) of from 0.3 to 1.5, said poly(ethylene oxybenzoate) has an intrinsic viscosity [$\eta$] of from 0.3 to 1.3 and said poly(ethylene oxybenzoate) is present in an amount of from 5 to 30%.

18. The composition as claimed in claim 13, wherein said aromatic co-polyester has a logarithmic viscosity ($\eta$inh) of from 0.4 to 0.8 and said poly(ethylene oxybenzoate) is present in an amount of from 0.1 to 5%.

19. The composition as claimed in claim 13, wherein said aromatic co-polyester has a logarithmic viscosity ($\eta$inh) of from 0.4 to 0.8 and said poly(ethylene oxybenzoate) is present in an amount of from 5 to 30%.

20. The composition as claimed in claim 18, wherein said poly(ethylene oxybenzoate) has an intrinsic viscosity [$\eta$] of from 0.5 to 1.1.

21. The composition as claimed in claim 19, wherein said poly(ethylene oxybenzoate) has an intrinsic viscosity [$\eta$] from 0.5 to 1.1.

22. A molded article produced from the composition of claim 1.

23. A method for reducing crazing and improving the moldability of molded articles of aromatic co-polyesters as defined in claim 1 comprising blending from 0.1 to 50 weight % of poly(ethylene oxybenzoate) therewith, based on the sum of the weight of said aromatic co-polyester and said poly(ethylene oxybenzoate), prior to molding.

* * * * *

UNITED STATES PATENT AND TRADEMARK OFFICE
CERTIFICATE OF CORRECTION

PATENT NO. : 3,884,990
DATED : May 20, 1975
INVENTOR(S) : Sakata et al

It is certified that error appears in the above-identified patent and that said Letters Patent are hereby corrected as shown below:

Between Columns 5 and 6, please insert the following:

-- phenol and a mixture of a diaryl ester of terephthalic acid and isophthalic acid. A typical diaryl ester is the diphenyl ester. The reaction temperature employed is in the range of from about 150 to 350° C, more preferably from 180 to 320° C. The reaction pressure is usually varied during the course of the reaction from atmospheric pressure at the early part of the reaction to reduced pressure, such as below 0.02 mmHg, toward the end of the reaction.

In melt polymerization, the molar ratio of the bisphenol and the mixture of terephthalic acid-isophthalic acid components to prepare a high molecular weight aromatic co-polyester must be maintained exactly equivalent.

A number of catalysts can be used. Catalysts which are preferably used are titanium compounds, such as butyl orthotitanate and titanium dioxide. Other cata- --

Signed and Sealed this thirtieth Day of March 1976

[SEAL]

Attest:

RUTH C. MASON
Attesting Officer

C. MARSHALL DANN
Commissioner of Patents and Trademarks